Figure 1:
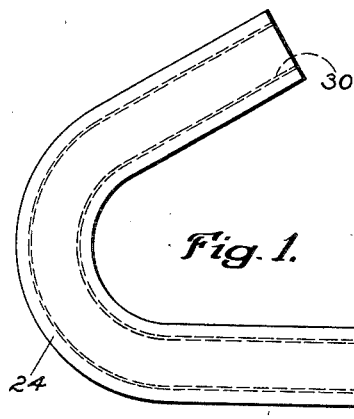

Dec. 23, 1952     G. P. JOHNSON     2,622,900
DRAIN HOSE

Filed July 3, 1946

GEORGE P. JOHNSON, INVENTOR.

BY Kenway & Witter

ATTORNEYS

Patented Dec. 23, 1952

2,622,900

UNITED STATES PATENT OFFICE 2,622,900

DRAIN HOSE

George Philip Johnson, Watertown, Mass., assignor to Boston Woven Hose and Rubber Company, Cambridge, Mass., a corporation of Massachusetts Application July 3, 1946, Serial No. 681,323

1 Claim. (Cl. 285—75)

This invention comprises an improved drain hose for use with washing machines and the like and to a novel and improved method of producing the same. Washing machines and other like equipment where water must be frequently pumped or drained out of the unit into a sink or drain are ordinarily provided with a drain hose having a free end curved or bent to U-shape for hooking over the edge of the sink. Heretofore such drain hose units have been formed by cutting tubed hose into the desired unit lengths and thereafter temporarily inserting a curved form or mandrel into one end and curing the hose while thus supported, whereby permanently forming such end to the shape of the mandrel. This method is not only expensive but it furthermore results in an unsatisfactory product in which the curved end is easily deflected and damaged and fails to maintain its serviceability. The primary object of my invention comprises the production of a stronger and more serviceable drain hose employing a thin-walled U-shaped tubular member closely associated with the free end of the hose unit and holding it permanently to the desired shape.

My invention contemplates the tubing of rubber into continuous lengths and curing the same in such lengths from which are cut shorter pieces to form drain hose units, such procedure being more economical and producing a better product than can be produced by curing the hose in independent short lengths. I then form one end of each unit to the desired shape by inserting thereinto a U-shaped thin-walled tube constructed closely to fit the interior of the hose where it remains permanently and conforms the hose to the desired shape. The tube can be of any corrosion resistant metal, hard rubber, plastic or any other suitable material properly shaped and having sufficient stiffness and strength to hold the hose end permanently in the desired hook shape. The resulting product is produced more economically than like drain units heretofore known and is substantially stronger and better able to resist the twisting action encountered in actual use without becoming disconnected from the sink. The production of an improved drain hose unit of this nature and for the purpose described comprises a further object of the invention.

A further feature of the invention comprises a swivel joint in my improved drain hose permitting free rotation and twisting movement of the body portion of the hose relative to the U-shaped discharging end portion. Such construction eliminates wear, disconnections, etc. heretofore occasioned when using the drain hose and provides freedom of movement for the apparatus to which the hose is attached. The production of an improved drain hose embodying this novel feature comprises a further object of the invention.

Figure 2:
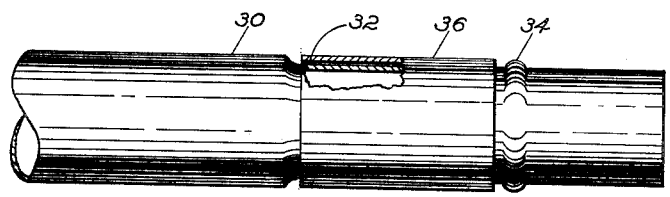
Figure 3:
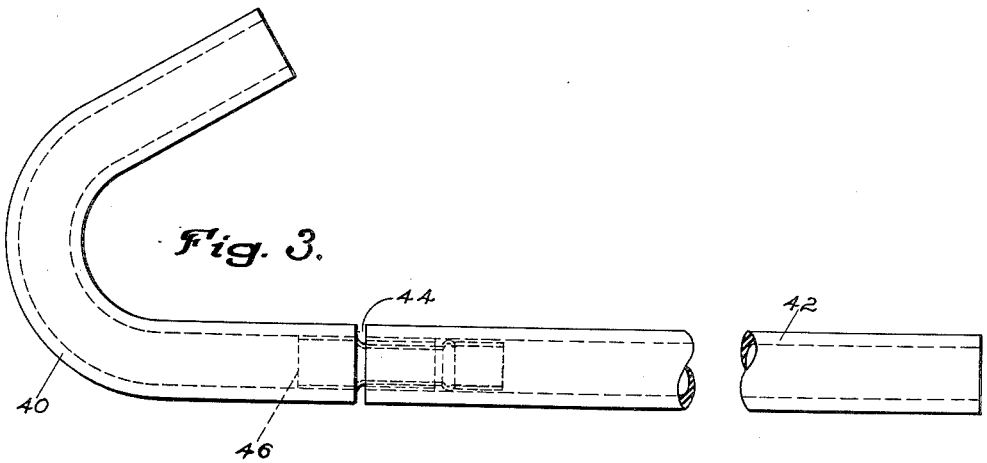

These and other features of the invention will be best understood and appreciated from the following description of a preferred embodiment thereof selected for purposes of illustration and shown in the accompanying drawing in which, Fig. 1 is a fragmentary elevation of a drain hose embodying my invention, Fig. 2 is an enlarged fragmentary elevation of a connecting swivel tube employed, and Fig. 3 illustrates a somewhat modified drain hose embodying the invention.

One important use of my improved drain hose is in association with a washing machine for pumping or drawing the wash water therefrom into a sink. One end of the hose is attached to the washing machine and its other end is formed into U-shape to hook over the edge of the sink. The invention particularly concerns the forming and permanent holding of this U-end to the desired shape to hook over the sink.

In the form of invention illustrated in Figs. 1 and 2, my drain hose employs two pieces 24 and 26 of extruded rubber tubing connected together by a novel swivel joint 28. This construction contemplates the employment of a thin walled tube 30 of suitable material and size to fit closely the interior of the rubber tubing and of a U-shape to provide the necessary hook within the rubber tubing 24. The tube 30 is inserted within the rubber tubing piece 24 and extends outwardly beyond one end of the tubing at 32 where it is of reduced diameter at opposite sides of an annular rib 34. A cylindrical thimble 36 of a diameter to closely fit within the rubber tubing piece 26 is loosely mounted on the reduced diameter portion 32 rearwardly of the rib 34, the piece 26 closely fitting the thimble and rib. Such construction provides a tubular swivel joint between the two pieces and permits free rotation of the piece 26 relative to the piece 24.

The tube 30 provides a reinforcing support for the rubber tubing 24 and not only permanently maintains the end of the drain hose to its U-shape but also serves firmly to support the weight of the hose and its contents when hooked over a sink or the like. The tube 30 is preferably located interiorly of the hose as illustrated whereby disposing the rubber tubing outwardly thereof to serve as a cushion and the disposition and character of the tube are such that it serves its function without substantially obstructing the passage through the drain hose or the U-portion thereof which hooks over the sink.

In Fig. 3 I have illustrated two hose tubing pieces 40 and 42 as connected by a swivel joint at 44. The swivel joint embodies a relatively short tube 46 secured within and extending outwardly of the hose piece 40, the thimble and mounting of the piece 42 being otherwise the same as illustrated in Figs. 1 and 2. In this case the hose piece 40 is cured permanently to retain the U-shape illustrated and the swivel joint permits free rotation of the piece 42 relative to the piece 40.

It will now be apparent that I have produced a new and substantially improved drain hose for the purpose described and have employed a method that effects such production at substantial economy. In accordance with my preferred procedure, the rubber tubing is extruded and cured in continuous lengths by the conventional and most economical process and the final product is thereafter produced merely by cutting the required lengths therefrom and inserting the tube 30. The permanency of the product and its continued service for the required functions will be readily apparent.

Having now disclosed my invention what I claim as new desire to secure by Letters Patent is:

A drain hose for washing machines and the like, comprising a metal tube having a first portion of uniform diameter and a second portion of reduced diameter integrally joined at their junction, an annular rib fixed on the second portion of the tube in spaced relation from said junction, a cylindrical thimble of said uniform diameter loose on the second portion of the tube between said junction and rib, and two pieces of hose of an internal diameter corresponding to said uniform diameter having end portions engaged respectively over the first portion of the tube and the rib and thimble, the ends of said end portions of hose being in coaxial and closely adjacent relation at said junction.

GEORGE PHILIP JOHNSON.

REFERENCES CITED

The following references are of record in the file of this patent:

UNITED STATES PATENTS

| Number | Name | Date |
|---|---|---|
| 170,457 | White | Nov. 30, 1875 |
| 609,383 | Anderson | Aug. 16, 1898 |
| 2,073,824 | Baird | Mar. 16, 1937 |
| 2,073,828 | Baird | Mar. 16, 1937 |
| 2,095,087 | Siddall | Oct. 5, 1937 |
| 2,141,916 | Johnson | Dec. 27, 1938 |
| 2,233,471 | Clements | Mar. 4, 1941 |
| 2,333,349 | Weatherhead | Nov. 2, 1943 |